US006826951B1

(12) United States Patent
Schuessler, Jr. et al.

(10) Patent No.: US 6,826,951 B1
(45) Date of Patent: Dec. 7, 2004

(54) TIRE MANAGEMENT SYSTEM AND METHOD FOR SURVEYING AND SERVICING A VEHICLE TIRE

(75) Inventors: Warren E. Schuessler, Jr., Chesterfield, MO (US); Ray G. Buckles, St. Louis, MO (US); Timothy G. Pace, St. Peters, MO (US)

(73) Assignee: International Marketing, Inc., Chambersburg, PA (US)

( * ) Notice: Subject to any disclaimer, the term of this patent is extended or adjusted under 35 U.S.C. 154(b) by 0 days.

(21) Appl. No.: 09/600,369

(22) PCT Filed: Jan. 14, 1999

(86) PCT No.: PCT/US99/00751

§ 371 (c)(1),
(2), (4) Date: Jul. 14, 2000

(87) PCT Pub. No.: WO99/36850

PCT Pub. Date: Jul. 22, 1999

Related U.S. Application Data

(60) Provisional application No. 60/071,362, filed on Jan. 15, 1998.

(51) Int. Cl.[7] .................. G01M 17/02; B60C 19/08; B60C 23/10; B60C 29/00
(52) U.S. Cl. .................. 73/146; 152/152.1; 152/415
(58) Field of Search .................. 701/29, 30; 73/146, 73/146.5, 8, 146.2, 146.3; 340/444, 442, 447; 434/219; 301/5.24; 141/4; 152/416, 415, 152.1; 102/531

(56) References Cited

U.S. PATENT DOCUMENTS

| 3,740,710 A | 6/1973 | Weintraub et al. ........ 340/52 R |
| 3,769,843 A | 11/1973 | Sperberg .................. 73/432 R |
| 3,933,036 A | 1/1976 | Lippmann et al. ............ 73/146 |
| 3,956,931 A | 5/1976 | Grosch et al. ................ 73/146 |
| 4,031,363 A | 6/1977 | Freeman et al. ......... 235/150.2 |
| 4,072,850 A | 2/1978 | McGlynn ..................... 364/424 |
| 4,090,247 A | 5/1978 | Martin ....................... 364/900 |
| 4,159,531 A | 6/1979 | McGrath ..................... 364/900 |
| 4,236,215 A | 11/1980 | Callahan et al. ............ 364/436 |
| 4,241,403 A | 12/1980 | Schultz ....................... 364/300 |
| 4,267,569 A | 5/1981 | Baumann et al. ........... 364/431 |
| 4,361,870 A | 11/1982 | D'Agostini et al. ........ 364/424 |
| 4,372,366 A | 2/1983 | Dugger ......................... 157/13 |
| 4,387,296 A | 6/1983 | Newell et al. ............. 235/376 |
| 4,404,639 A | 9/1983 | McGuire et al. ............ 364/551 |

(List continued on next page.)

FOREIGN PATENT DOCUMENTS

EP          0 084 514 A1     7/1983

OTHER PUBLICATIONS

International Search Report, Apr. 8, 1999.

*Primary Examiner*—Edward Lefkowitz
*Assistant Examiner*—Octavia Davis
(74) *Attorney, Agent, or Firm*—Senninger, Powers, Leavitt & Roedel

(57) ABSTRACT

In a tire management system and method for surveying and servicing a vehicle tire, a portable hand held computer unit receives and stores data for servicing the vehicle tire and data acquired from the vehicle tire. A desired tire air pressure is input into the portable hand held computer unit and is transmitted from the hand held computer unit to a tire inflation device adapted for automatically inflating or deflating the vehicle tire to the desired tire air pressure. The tire inflation receives the desired tire air pressure and is operated in response to receiving the desired tire air pressure to measure the actual tire pressure of the tire, to transmit the actual tire pressure back to the hand held computer unit for storage therein, to inflate or deflate the tire to the desired tire air pressure and to transmit a final measured tire air pressure back to the hand held computer unit.

9 Claims, 10 Drawing Sheets

U.S. PATENT DOCUMENTS

| | | | |
|---|---|---|---|
| 4,434,652 A | 3/1984 | Christie | 73/146 |
| 4,435,769 A | 3/1984 | Nagano et al. | 364/464 |
| 4,440,018 A | 4/1984 | Christie | 73/146 |
| 4,523,297 A | 6/1985 | Ugon et al. | 364/900 |
| 4,674,056 A | 6/1987 | Goodfellow | 364/483 |
| 4,704,901 A | 11/1987 | Rocco et al. | 73/146.8 |
| 4,748,845 A | 6/1988 | Rocco et al. | 73/146.8 |
| 4,773,011 A * | 9/1988 | VanHoose | 364/424.03 |
| 4,818,029 A * | 4/1989 | Mourot et al. | 301/5.24 |
| 4,911,217 A * | 3/1990 | Dunn et al. | 152/152.1 |
| 4,969,212 A | 11/1990 | Walter | 346/424.03 |
| 5,313,995 A * | 5/1994 | Schultz | 152/416 |
| 5,335,541 A * | 8/1994 | Sharpe | 73/146.5 |
| 5,338,776 A | 8/1994 | Peelor et al. | 523/166 |
| 5,409,045 A * | 4/1995 | Walker et al. | 141/4 |
| 5,573,611 A | 11/1996 | Koch et al. | 152/152.1 |
| 5,587,698 A * | 12/1996 | Genna | 340/442 |
| 5,639,962 A | 6/1997 | Maloney | 73/146 |
| 5,883,306 A | 3/1999 | Hwang | 73/146.8 |
| 5,891,277 A * | 4/1999 | Bachhuber | 152/415 |
| 6,034,676 A * | 3/2000 | Egan et al. | 345/326 |

* cited by examiner

TIRE MANAGEMENT SYSTEM AND METHOD FOR SURVEYING AND SERVICING A VEHICLE TIRE

This application claims the benefit of provisional application Ser. No. 60/071,362 filed Jan. 15, 1998.

BACKGROUND OF THE INVENTION

This invention relates generally to a tire management system and, particularly, to such a system having an auto-inflation device for inflating or deflating a tire and using a handheld computer for surveying and servicing the tire which communicates with the auto-inflation device and communicates with another computer for managing the gathered tire data.

U.S. Pat. No. 4,773,011, the entire disclosure of which is incorporated herein by reference, describes a method of surveying, selecting, evaluating or servicing tires. According to the method disclosed in this patent, an individual gathers data regarding, for example, overhead costs, vehicle data and tire data. A computer then uses this data to determine the types of tires to be installed at each position of the vehicle and/or how the tires should be serviced. U.S. Pat. No. 4,773,011 further discloses a handheld computer for assisting the individual in gathering data. As shown in this patent, the handheld computer has a keyboard for entering data, an alphanumeric display and a memory. The handheld computer may also be used with a device for measuring air inflation pressure of the tire and a depth transducer for measuring the tread depth of the tires. Either device may be interfaced to an input port of the handheld computer by a cable attached at one end to a connector on each device. The other end of the cable is attached to the input port.

Unfortunately, the method of U.S. Pat. No. 4,773,011 proves too complicated to execute by the majority of users in the tire maintenance and fleet management industries and lacks many useful features needed to be practical under normal working conditions. For example, a tire data management system is desired which provides a user friendly, easy to use interface for gathering data. Also, conventional handheld computers for use in tire data management are lacking because their ports and connectors for power, serial access and the like use mechanical connectors which are often small and fragile and, thus, are unacceptable in the relatively hostile work environments associated with tire servicing. For this reason, there is a desire for a handheld unit for gathering tire data which is rugged and provides data communication via non-mechanical means.

Further, a system is desired which provides remote data gathering and uploading and central data management so that it may easily be used by a tire maintenance service or vehicle fleet with multiple locations.

In addition, a system is desired which facilitates data gathering simultaneously with performing maintenance functions such as inflating the tire under inspection. Such a system is also desired which inflates or deflates the tire to the recommended tire air pressure and communicates tire pressure information to the computer system automatically.

SUMMARY OF THE INVENTION

Among the several objects of this invention are the provision of a tire management system and method for surveying and servicing a vehicle tire; the provision of such a system and method which provides data communication via non-mechanical means; the provision of such a system and method which provides remote data gathering and uploading and central data management so that it may easily be used by a tire maintenance service or vehicle fleet with multiple locations; and the provision of such a system and method which facilitates data gathering simultaneously with performing tire servicing functions; and the provision of such a system and method in which certain tire servicing functions are conducted and the results communicated to a remote computer unit automatically.

In general, a tire management system of the present invention for surveying and servicing a vehicle tire generally comprises a portable handheld computer unit capable of receiving and storing data for servicing the vehicle tire and data acquired from the vehicle tire. The handheld computer unit is adapted for transmitting the servicing data to a location remote from the handheld computer unit. The servicing data includes a desired tire air pressure. A tire inflation device is adapted for automatically inflating or deflating the vehicle tire to the desired tire air pressure. The tire inflation device is further adapted to receive the desired tire air pressure transmitted by the handheld computer unit and to transmit a signal back to the handheld computer unit once the tire has been serviced by the inflation device to the desired tire air pressure.

A method of the present invention of surveying and servicing the tire of a vehicle comprises inputting data for servicing the tire into a portable handheld computer unit. The servicing data includes a desired tire air pressure for the vehicle tire. The desired tire air pressure is transmitted from the handheld computer unit to a tire inflation device capable of receiving the desired tire air pressure. The tire inflation device is operated in response to receipt of the desired tire air pressure to measure the actual tire pressure of the tire and to transmit the actual tire pressure back to the handheld computer unit for storage therein. The tire inflation device is then further operated in response to receipt of the desired tire air pressure to inflate or deflate the tire to the desired tire air pressure and to transmit a final measured tire air pressure back to the handheld computer unit.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
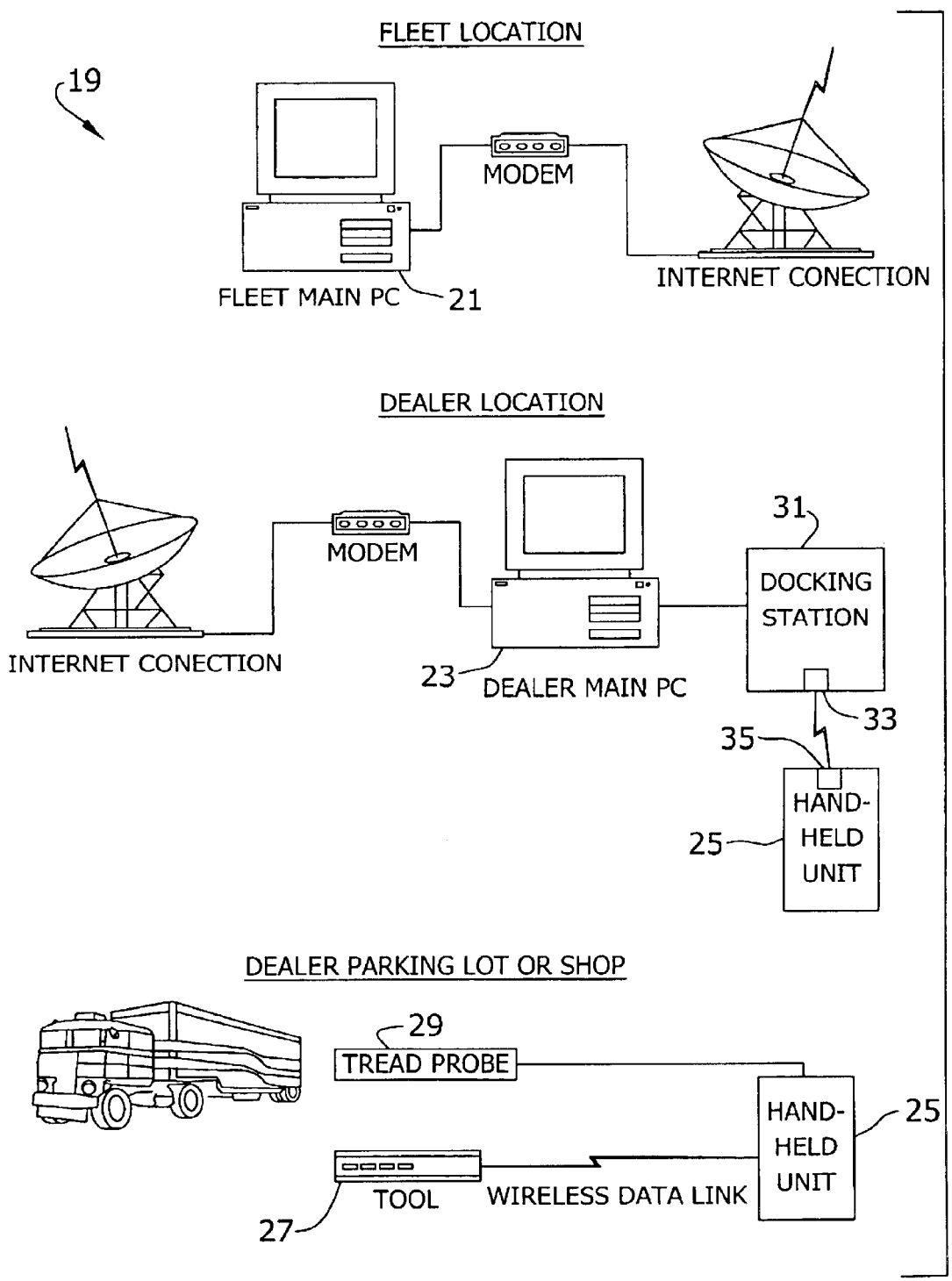
FIG. 1 is a block diagram of a tire management system according to a preferred embodiment of the invention.

With reference to FIG. 1, a tire management system of the present invention is indicated in its entirety as 19. As shown in the block diagram of FIG. 1, the system 19 comprises a central computer 21, a database computer 23, a portable, handheld computer unit 25, an auto-inflation device 27 and a tread depth measuring device, or probe, 29. The central and database computers 21, 23 may be mainframes, personal desktop or laptop computers or other commonly known computers used for operating software. In a preferred embodiment, central computer 21 executes tire management software for storing, processing and analyzing accumulated tire characteristic and performance data for a particular vehicle or a fleet of vehicles. One preferred tire management software is available from Budini Tire Management Systems under the title "AIM/BUDINI TIRE MANAGEMENT."

As an example, central computer 21 is located at a central site such as headquarters for a fleet of vehicles and database computer 23 is located at a remote site such as a dealership or maintenance shop. According to the invention, central computer 21 executes the tire management software for determining servicing requirements and procedures for various tires, optimal positioning and sequencing of tires on vehicles, and operating costs, repair costs and other overhead costs associated with tires used by the fleet of vehicles. This information may then be downloaded to database computer 23 as needed for use with, for example, specific vehicles in the fleet. As is known in the art, data may be downloaded from one computer (i.e., central computer 21) to a remote computer (i.e., database computer 23) via modem-to-modem communication over a global communications network.

It is to be understood that database computer 23 can implement both the tire management software for the central site as well as the remote site. In other words, it is contemplated that database computer 23 can function as both central computer 21 and database computer 23 when on-site management is desired. As described above, one example of the use of system 19 includes locating central computer 21 at a fleet location and locating database computer 23 at a dealer location. In this instance, servicing of the tires takes place in the dealer parking lot or shop. In the alternative, the central and database computers 21, 23 may be embodied by a single computer located at the fleet location. In this instance, servicing of the tires takes place in the fleet parking lot or shop.

As described above, central computer 21 executes tire management software for providing a tire management strategy including preventive maintenance servicing schedules and the like. By updating the tire and maintenance data used by central computer 21, system 19 provides improved tire management even as circumstances change. Advantageously, handheld unit 25 allows the operator to easily update the data used by central computer 21 with newly gathered tire and maintenance data.

Preventive tire maintenance, for example, is usually performed at a remote location such as a dealership for a fleet of vehicles. In this instance, an operator may be responsible for servicing the tires of many vehicles and for gathering data (otherwise referred to as surveying the tire) regarding the tires. According to the invention, handheld unit 25 facilitates tire surveying and servicing. In this embodiment, an input/output port associated with database computer 23 enables information to be transferred from computer 23 to handheld unit 25 and vice-versa. As described above, this information was previously downloaded from central computer 21. The input/output port preferably provides a wireless (e.g., infrared) connection so that wire attachment of handheld unit 25 to database computer 23 is unnecessary. As shown in FIG. 1, a docking station 31, adapted to receive handheld unit 25, is connected to database computer 23 via a cable attached to one of the computer's COM ports. Preferably, both the docking station 31 and handheld unit 25 include compatible infrared (IR) links 33, 35, respectively, which are aligned when handheld unit 25 is received by, or docked in, docking station 31. In this manner, handheld unit 25 and database computer 23 can communicate with each other without direct physical connection.

Handheld unit 25 preferably includes a battery (not shown) for supplying it with power. In addition to the IR link 33, docking station 31 also includes battery charging circuitry (not shown) for connecting the battery of handheld unit 25 to a power supply when it is docked in docking station 31.

Instead of using the docking station 31 and IR links 31, 33, the handheld unit 21 may communicate with the database computer 23 via a serial connection (not shown) between the handheld unit and the base computer's COM port and remain within the scope of this invention.

Figure 2:
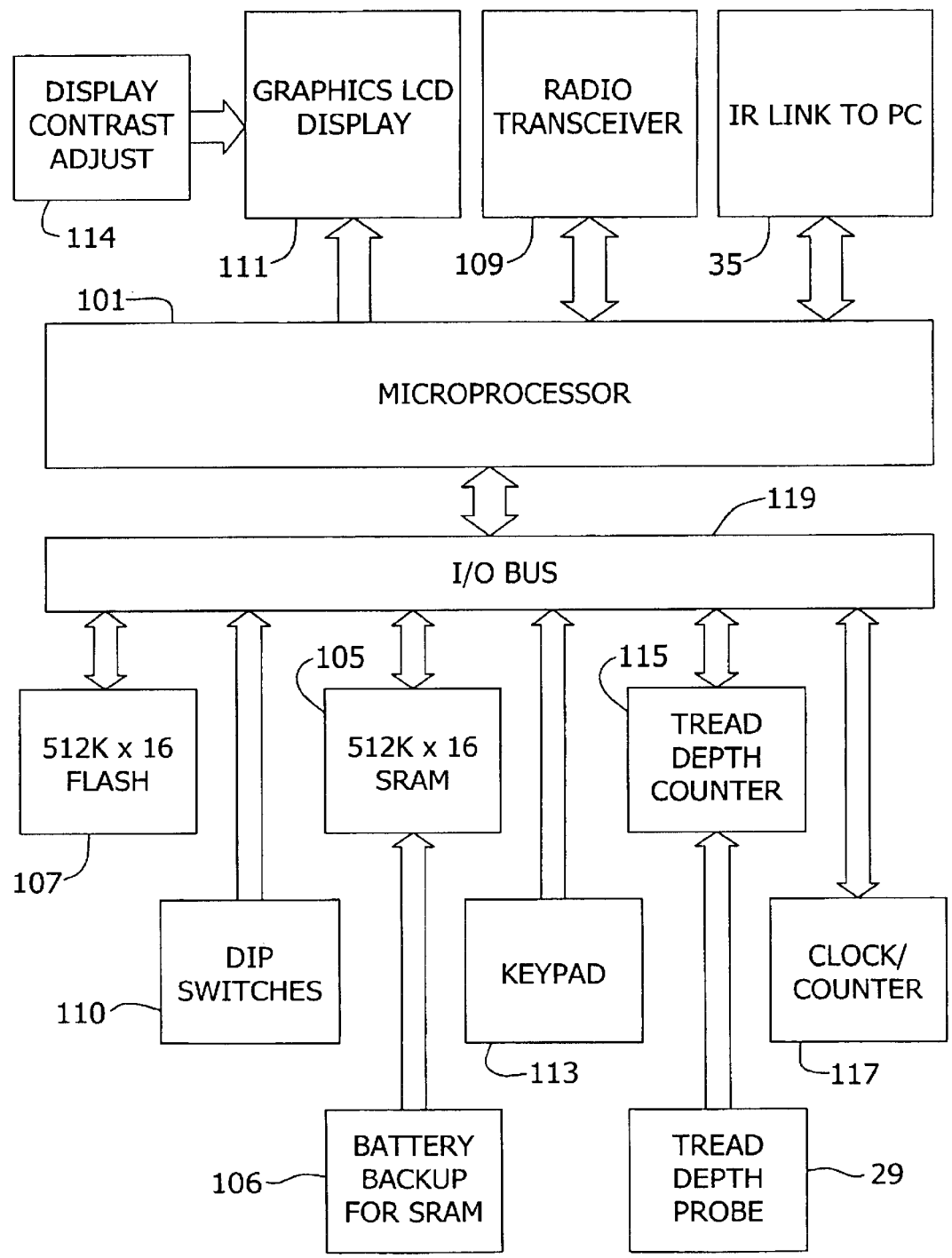
FIG. 2 is a block diagram of a handheld computer unit of the tire management system of FIG. 1.

FIG. 2 illustrates the electronic circuitry of handheld unit 25 in block diagram form. As shown, handheld unit 25 includes a microprocessor 101 operatively connected to the IR link 35 for wireless data transmission to and from database computer 23 (via docking station 31). Handheld unit 25 downloads data from database computer 23 and stores it in a static RAM (SRAM) memory 105 provided with a battery backup 106. For example, the downloaded data includes specific vehicle and tire information for up to 50 vehicles. In operation, the microprocessor 101 of handheld unit 25 executes software stored in a flash memory 107 to provide a user interface for the tire management software as well as an interface for tools such as the auto-inflation device 27 and tread depth measuring device 29.

In one preferred embodiment of the invention, handheld unit 25 includes a radio frequency (RF) link 109, embodied by a radio transceiver, for wireless communication with auto-inflation device 27. As will be described in detail below, handheld unit 25 retrieves data regarding tire pressure for a specific tire from the memory 105 and transmits the data to auto-inflation device 27 via the RF link 109. In response to an activation signal accompanying the pressure data, auto-inflation device 27 automatically inflates or deflates the tire to the desired air pressure and then instructs handheld computer unit 25 when it is finished. As shown in FIG. 2, handheld unit 25 also includes a set of dip switches 110 for setting an identification number for the transceiver of RF link 109 to match a corresponding identification number for a transceiver associated with the automatic tire inflating device 27.

Figure 3:
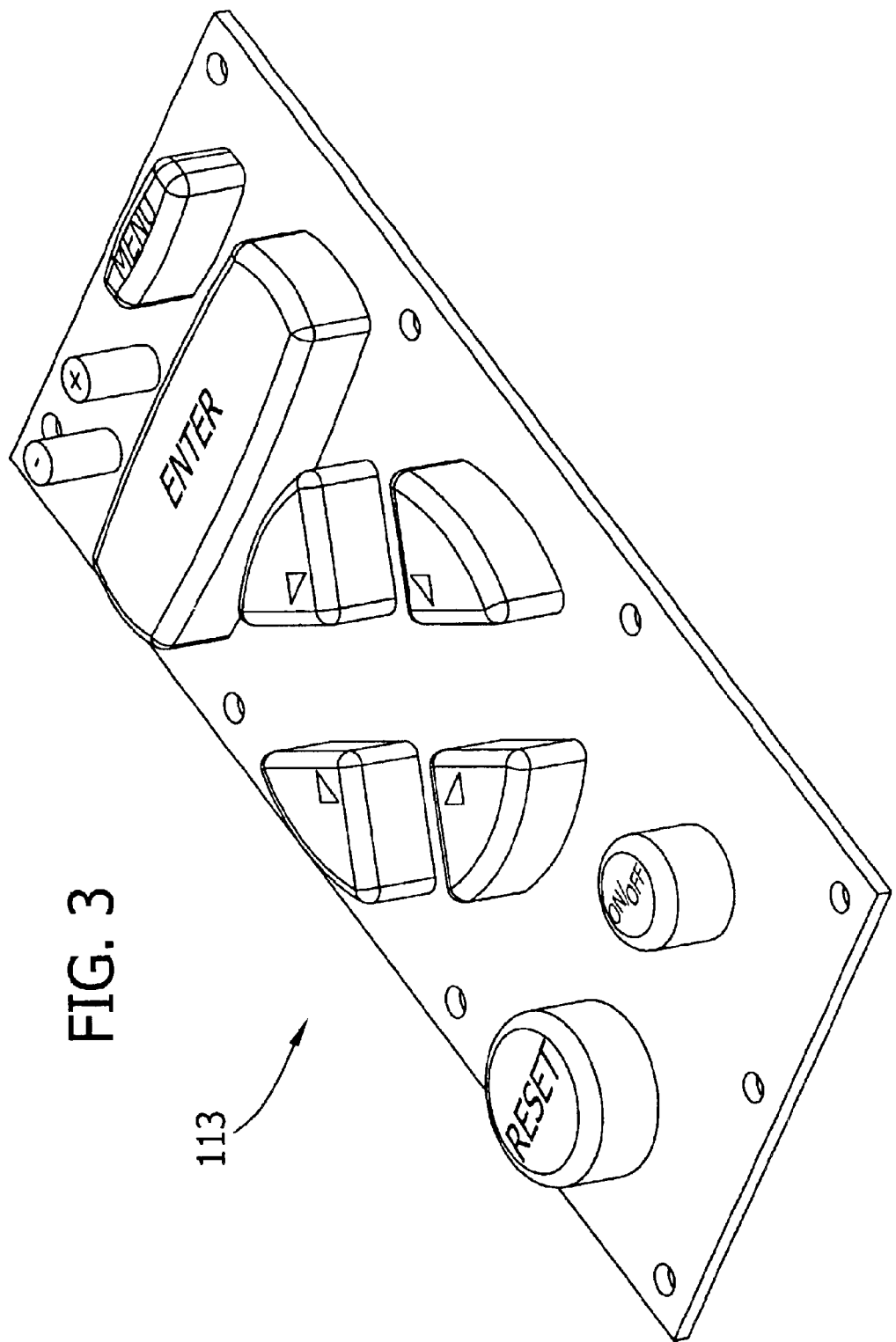
FIG. 3 is a perspective of a keypad of the handheld computer unit of FIG. 2.

To facilitate information gathering by the operator, handheld unit includes a visual display 111 and a keypad 113 (see FIG. 3). The software executed by microprocessor 101 preferably includes a sequence of instructions from computer 23 and, when handheld unit 25 is activated, produces the instructions on the display 111 to instruct the operator in performing data gathering and diagnostic procedures on the tires. According to the invention, the display 111 (e.g., a liquid crystal display) provides user friendly screen graphics providing information regarding, for example, vehicle type and identification, tire position and identification, and desired tire pressure. Further, display 111 also provides a user friendly interface for the operator to input the gathered tire data via the keypad 113. For example, simply by scrolling through a menu of options and then selecting one or more of the options with keypad 113, the operator is able to input data regarding tire pressure, tread depth and tire condition. The need for a more complicated, alpha-numeric keypad having multiple keys is thus eliminated. As shown in FIG. 2, handheld computer unit 25 also includes a circuit 114 for adjusting the contrast of display 111.

In addition, the electronic circuitry of handheld unit 25 includes a tread depth counter circuit 115 which communicates with probe 29 for providing tread depth measurements for the tire under inspection. Handheld unit 25 also has a clock/calendar circuit 117 for logging the date and time that the operator is gathering data. In this embodiment of the invention, an input/output bus 119 connects the various components of handheld unit 25 to microprocessor 101.

Preferably, handheld unit 25 is sized for being carried by an operator to a location remote from database computer 23, such as the parking lot or shop location of the vehicles being serviced and/or tracked, for use in gathering tire characteristic and performance data and, when required, servicing the tires. Handheld unit 25 generally comprises a easing for housing its various components and which is ergonometrically configured to allow the operator to easily hold the unit 25 in one hand while using the same hand to operate it via keypad 113. As such, the operator's other hand is generally free for taking tire measurements and otherwise servicing the tires.

As shown in FIG. 3, keypad 113 preferably has a simple, user friendly layout to facilitate the selection of options from a menu on display 111. For example, keypad 113 includes a power button, four arrow, or scroll, buttons for highlighting the desired menu option and an enter button for selecting the highlighted option. In a preferred embodiment, keypad 113 also includes a menu button which puts handheld unit 25 into a configuration for uploading or downloading data and for displaying an associated menu. The operator adjusts the contrast of display 111 as needed by depressing either of two contrast adjust buttons (labeled − and +). For convenience, keypad 113 also includes a reset button for causing handheld unit 25 to transmit an RF signal to the auto-inflation device 27 which resets the device.

Figure 4:
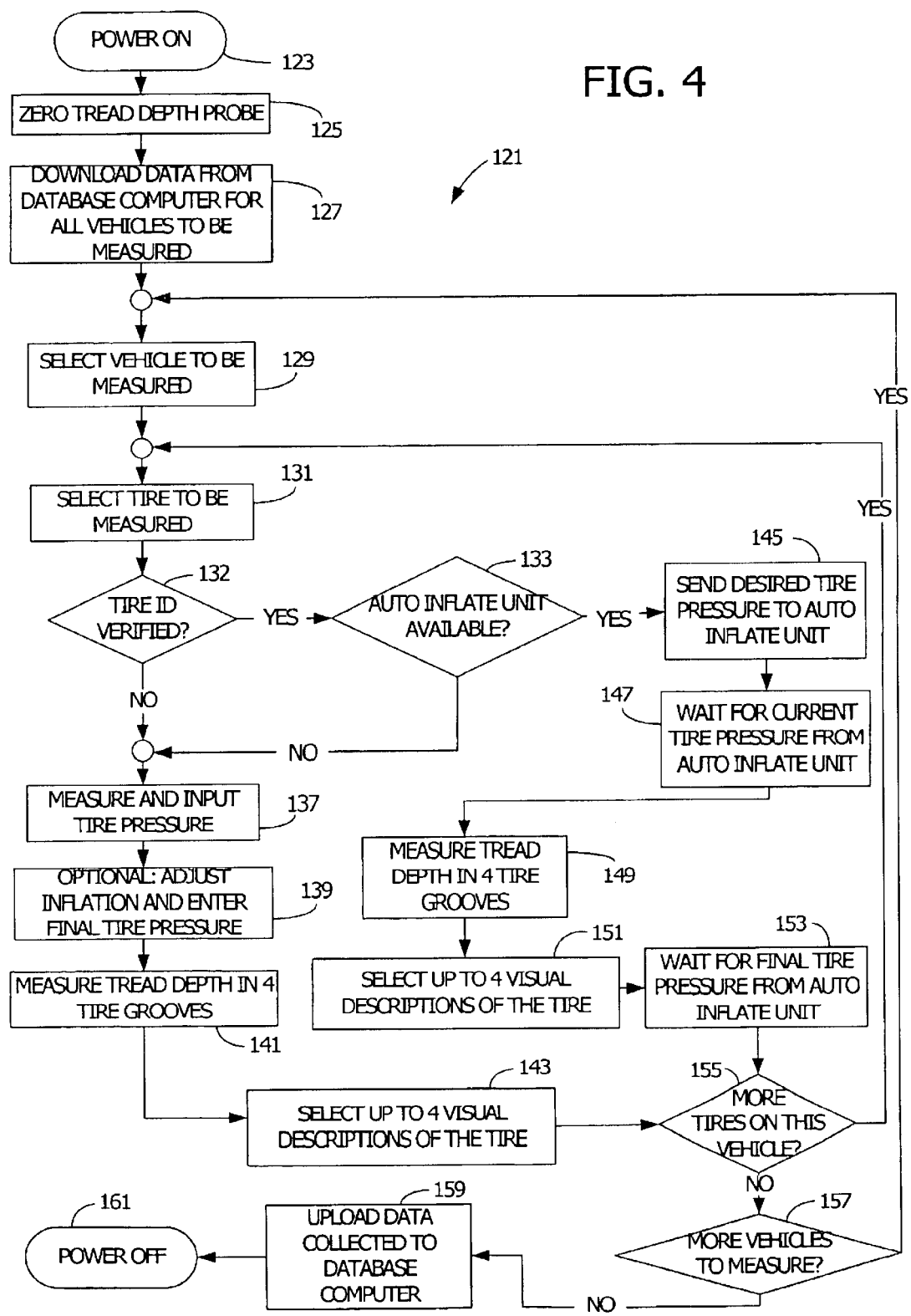
FIG. 4 is a flow diagram illustrating the operation of the handheld computer unit of FIG. 2.

Referring now to FIG. 4, handheld unit 25 operates according to a flow diagram 121 for gathering tire data which is then uploaded to database computer 23 and then uploaded to central computer 21 for use with the tire management software. At step 123, the operator turns on handheld unit 25 to begin operation and zeroes tread depth probe 29 at step 125. While not shown in detail in the drawings, the probe 29 is of a conventional design having a plunger extending out from and movable with respect to a stationary body of the probe. A spring disposed in the body biases the plunger outward of the body. The body also houses a suitable measuring device, such as an encoder circuit, for measuring the displacement of a plunger. To measure the tread depth the plunger is placed against the tire between adjacent treads and the body is pushed against the treads of the tire so that the plunger moves against the bias of the spring into the body of the probe. The encoder circuit measures the displacement of the plunger to define the tread depth of the tire. Preferably, probe 29 measures tread depth in ⅟₃₂ inch increments. By first placing tread depth probe 29 on a relatively flat surface, the operator defines its zero position.

Proceeding to step 127, the display 111 of handheld unit 25 preferably displays a menu of information regarding the vehicles for which data is to be gathered (i.e., the vehicles for which data was downloaded from database computer 23) and the operator selects a desired one of the vehicles from the menu. In a preferred embodiment, handheld unit 25 then displays a graphic illustration of the selected vehicle's tires, including their positions relative to one another. At step 129, the operator selects the tire to be inspected. Proceeding to step 131, handheld unit 25 displays identification data for the selected tire which the operator verifies against the selected tire's actual identification data at step 133. If the operator verifies that the actual identification information of the selected tire matches the displayed data, handheld unit 25 proceeds to step 135 in which it detects the presence of the auto-inflation device 27. If the auto-inflation device 27 is not being used, or if the tire identification data was not verified, operation continues at step 137. At step 137, the operator manually measures tire pressure and then inputs the information to handheld unit 25. Step 139 represents an optional step in which the operator then manually adjusts the tire air pressure to a desired air pressure and then enters the final pressure value in handheld unit 25.

Proceeding to step 141, the operator measures the depth of the selected tire's tread at several different places (e.g., four) with tread depth probe 29. According to the invention, handheld unit 25 records the four tread depth measurements when instructed by the operator.

At step 143, handheld unit 25 displays a menu of descriptors for describing the condition of the tire based on a visual inspection by the operator. Preferably, the operator selects one or more of the descriptors from the menu before proceeding.

Returning to step 135, if the auto-inflation device 27 is to be used, handheld unit 25 communicates with the auto-inflation device 27 via RF link 109. If auto-inflation device 27 is available to the operator, handheld unit 25 proceeds to step 145 for retrieving data representing the desired air pressure of the selected tire and transmitting the retrieved data to auto-inflation device 27. While waiting at step 147 for auto-inflation device 27 to inflate the tire to the desired pressure and to transmit this information back to handheld unit 25, operation proceeds to step 149 at which the operator measures tread depth. Following step 149, the operator performs a visual inspection of the tire at step 151 as described above for step 143. At step 153, auto-inflation device 27 instructs handheld unit 25 that it has finished inflating the tire and reports the final tire pressure.

Following steps 143 and 153, handheld unit 25 determines at step 155 whether any tires on the selected vehicle remain to be inspected. If so, operation of handheld unit 25 returns to step 131. If not, handheld unit 25 determines at step 157 whether any other vehicles from the downloaded vehicle data remain. If so, operation of handheld unit 25 returns to step 129. If not, the operator causes handheld unit 25 to upload the gathered data to database computer 23 at step 159 and ends operation at step 161. In turn, the operator causes database computer 23 to upload the gathered data to central computer 21 which then executes the tire management software to process the updated tire and maintenance data. As is known in the art, data may be uploaded from one computer (i.e., database computer 23) to another computer (i.e., central computer 21) via modem-to-modem communication over a global communications network.

Figure 10:
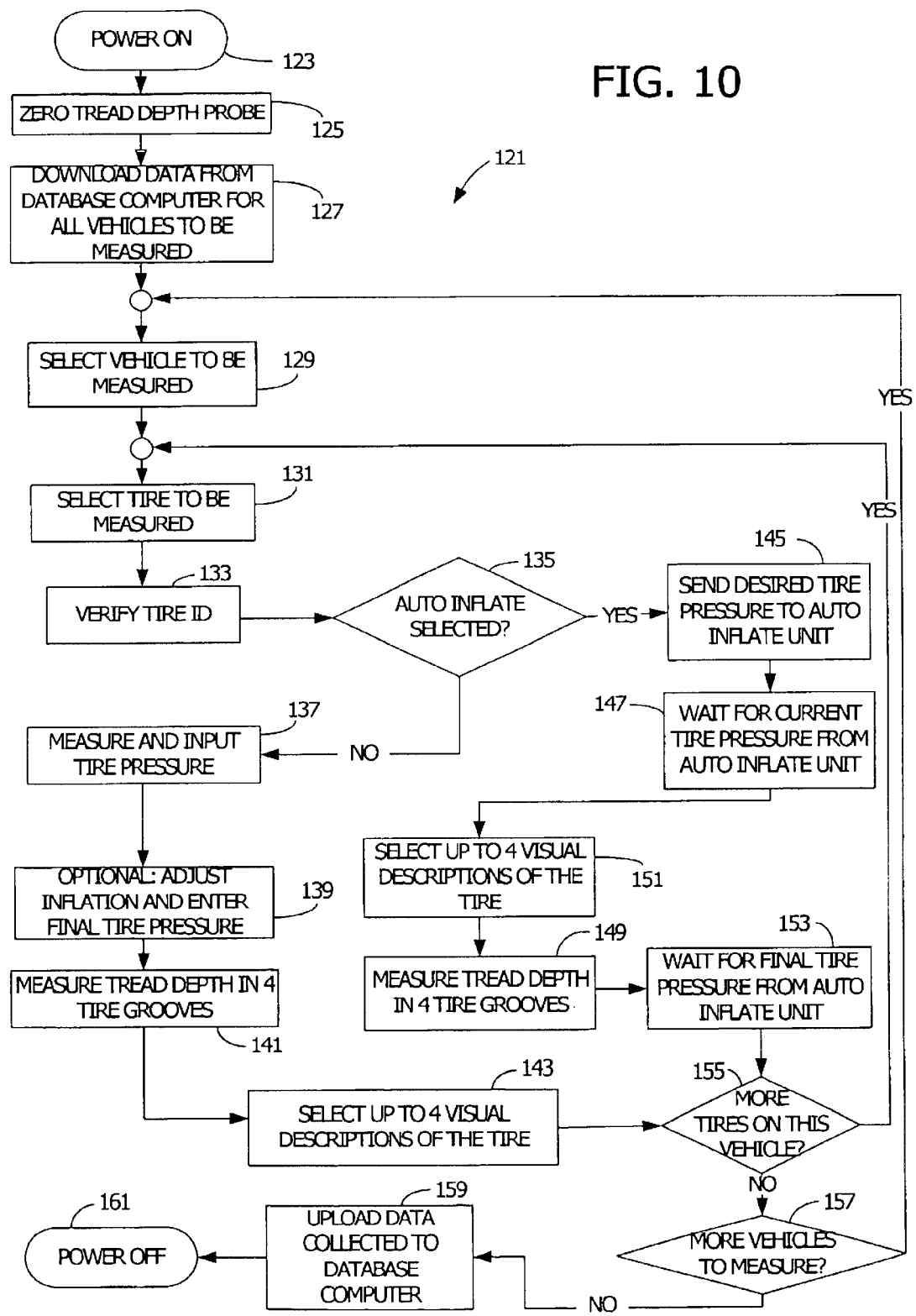
FIG. 10 is a flow diagram illustrating an alternative operation of the handheld computer unit of FIG. 2.

FIG. 10 illustrates an alternative flow diagram for operation of the handheld computer unit in which minor variations in the operating flow are present.

The auto-inflation device 27 samples the air pressure of the tire for recording in the handheld unit 25 and, when necessary, adjusts the air pressure of the tire to correspond to a desired tire air pressure specified by the tire management software. As further discussed below, the auto-inflation device 27 is capable of transferring and receiving data to and from the handheld unit 25 so that operation of the device is controlled and monitored by the operator via the handheld unit. For example, with reference to the flow diagram of FIG. 6, the handheld unit 25 initially transmits a desired tire air pressure to the auto-inflation device. At step 303, the device 27 determines whether a desired air pressure has been received and, upon receiving the desired air pressure, proceeds to step 304 and measures the current actual air pressure in the tire. The current measurement is transmitted back to the handheld unit at step 305 for recording. Then, if necessary, the device adjusts the tire air pressure at step 307 to generally match the desired tire air pressure and at step 309 transmits the adjusted air pressure data back to the handheld unit 25 for recording (for comparison to the air pressure recorded during prior servicings) and for conveying that the tire air pressure servicing is complete.

Figure 5:
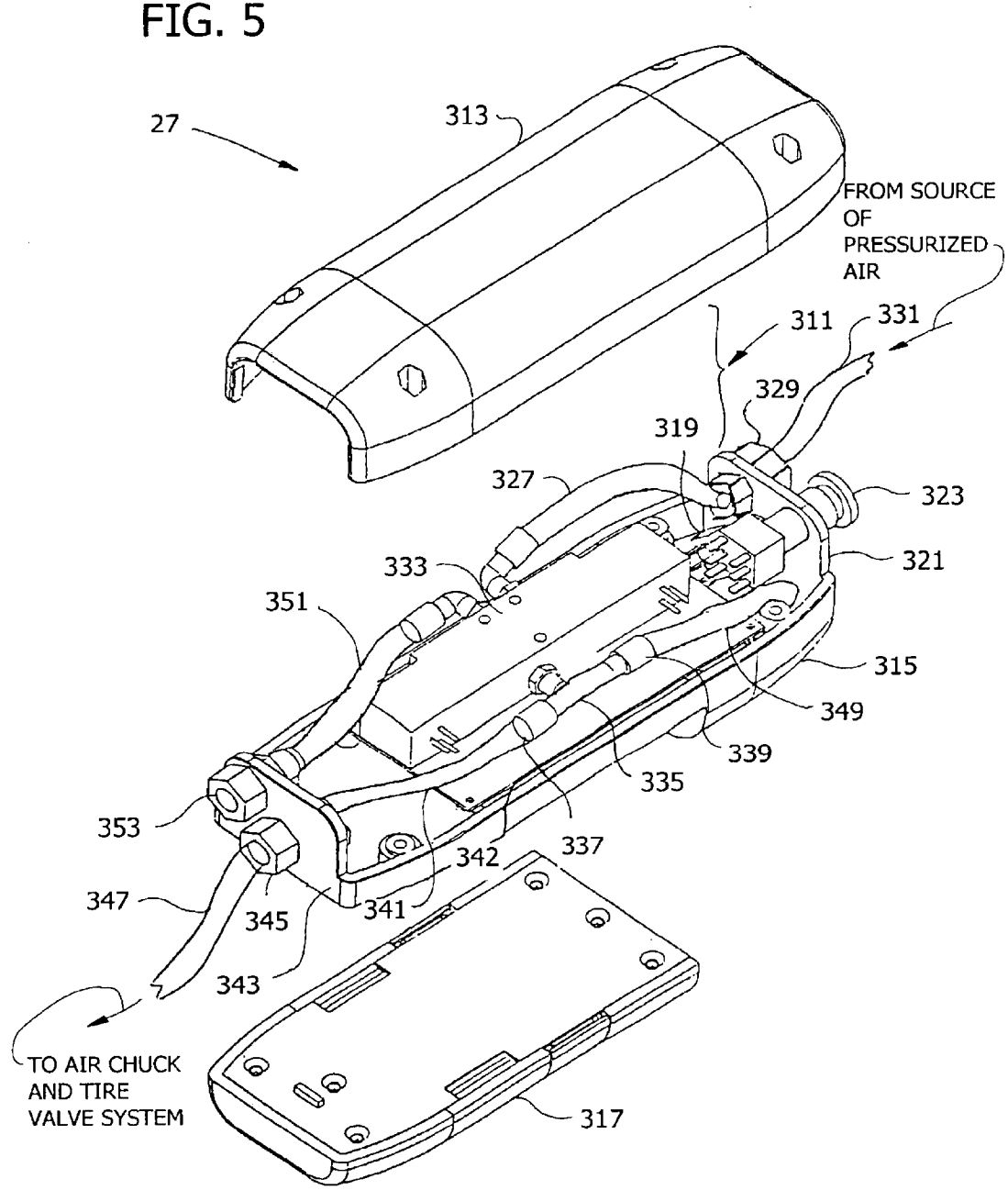
FIG. 5 is an exploded perspective view of an auto-inflation device of the present invention.

The auto-inflation device 27 comprises a casing, shown exploded in FIG. 5 and generally indicated at 311, having a top member 313 and a bottom member 315. The top and bottom members 313, 315 are configured for flush engagement with each other upon assembly and are releasably fastened together by suitable fasteners (not shown). A battery pack 317 defines a power source for the auto-inflation device 27 and is releasably attachable to the bottom member 315 of the easing 311 so that the battery pack may be removed and recharged while another battery pack is used to power the device. In the illustrated embodiment, the battery pack 317 and bottom member 315 are shaped and arranged so that the battery pack fits flush against the bottom member upon attachment to the casing 311 to provide a continuous surface along the bottom of the casing.

Figure 6:
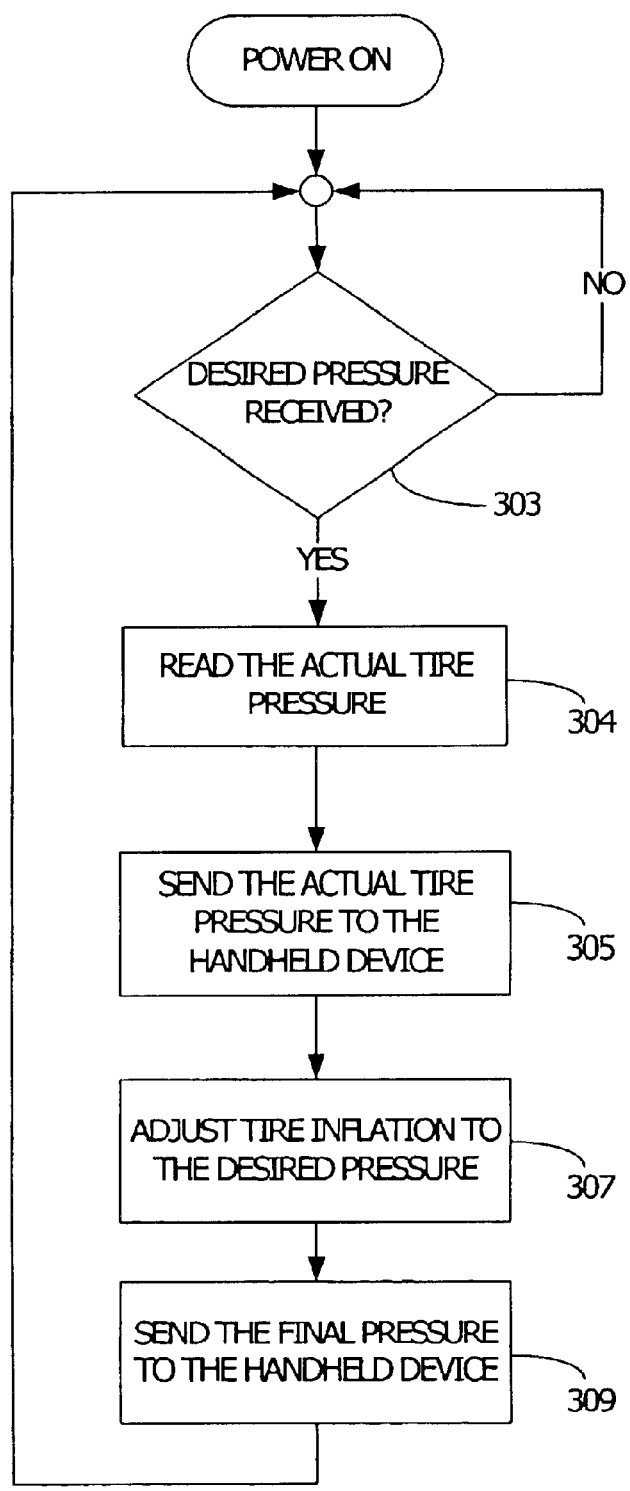
FIG. 6 is a block diagram of the operating sequence of an auto-inflation device of the system of FIG. 1.

A power switch 319 communicates with the battery pack 317 and extends outward through one end 321 of the easing 311 for manual movement between an operative position in which the auto-inflation device 27 is operable to function according to the flow diagram of FIG. 6 and an inoperative position in which the device is inoperable. An emergency stop switch 323 extending outward through the end 321 of the easing 311, generally adjacent the power switch 319, provides a secondary switch for rendering the device inoperable in the event of emergency. It is understood, however, that the emergency stop switch 323 may be omitted, such that the device 27 relies only on the power switch 319 for turning off the device, without departing from the scope of this invent ion.

The auto-inflation device 27 includes a wireless communication link for transferring and receiving data to and from the handheld unit 25. In the illustrated embodiment the wireless communication link is a conventional RF link 325 (FIG. 8), such as a radio transceiver. The RF link 325 is operational only when the power switch 319 is in its operative position.

An air inlet 327 extends within the casing 311 for receiving pressurized air into the casing. A fitting 329 is secured to the end 321 of the casing 311, generally adjacent the power switch 319, and is adapted for connection, such as by a hose 331, to a source of pressurized air (not shown). The fitting 329 is preferably capable of turning with respect to the casing 311 to inhibit twisting of the hose 331 as the operator moves around with and positions the auto-inflation device 27. The air inlet 327 communicates with an air valve 333 disposed in the casing 311 for delivering to the valve the pressurized air received into the casing. A T-connect 335 is connected to the valve 333 separate from the air inlet 327 and has opposing outlet ports 337, 339. An air outlet 341 extends within the casing 311 from one of the outlet ports 337 to an end 343 of the casing opposite the power switch 319. A fitting 345 is secured to the end 343 of the casing 311 and is adapted for connection, such as by a hose 347 and a chuck (not shown), to a valve stem (not shown) of the tire being serviced. As with the inlet fitting 329, the outlet fitting 345 is preferably capable of turning with respect to the casing 311 to inhibit twisting of the hose 347 as the operator moves around with and positions the auto-inflation device 27.

A transfer line 349 is connected to the other outlet port 339 of the T-connect 335 and communicates with a conventional pressure sensor 336 (FIG. 8), such as an analog pressure transducer (not shown) capable of measuring air pressure. There is no diaphragm or other membrane between the outlet ports 337, 339 of the T-connect 335 so that the pressure sensor 336 is in continuous fluid communication with the interior volume of the tire via the air outlet 341 for measuring the air pressure in the tire. An air exhaust 351 communicates with the valve 333 independent of the air inlet 327 and the T-connect 335 and extends within the casing 311 from the valve to an exhaust port 353 in the end 343 of the casing for exhausting pressurized air from the casing.

The valve 333 comprises solenoid valves 338 (FIG. 8) driven by suitable valve drivers 340 for selectively operating the valve between 1) an inflate position, 2) a deflate position and 3) a closed, inoperative position. It is also contemplated that a single, three-way solenoid valve (not shown) driven by a single valve driver (not shown) may used instead of the multiple valves and valve drivers without departing from the scope of the invention. In the inflate position, the air inlet 327 and the T-connect 335 are in fluid communication and the air exhaust 351 is blocked so that pressurized air entering the casing 311 via the air inlet is directed through the T-connect for delivery to the tire via the air outlet 341 for inflating the tire and to the pressure transducer via the transfer line 349 for measuring the air pressure in the inflating tire. In the deflate position, the T-connect 335 and the air exhaust 351 are in fluid communication and the air inlet 327 is blocked so that pressurized air in the tire is bled back into the casing 311 via the air outlet 341 and then exhausted from the casing via the air exhaust for deflating the tire. The air bled from the tire through the air outlet 341 is also directed to the pressure transducer via the transfer line 349 for measuring the tire air pressure of the deflating tire. Air flow through the valve 333 is fully blocked in the closed position of the valve.

Figure 8:
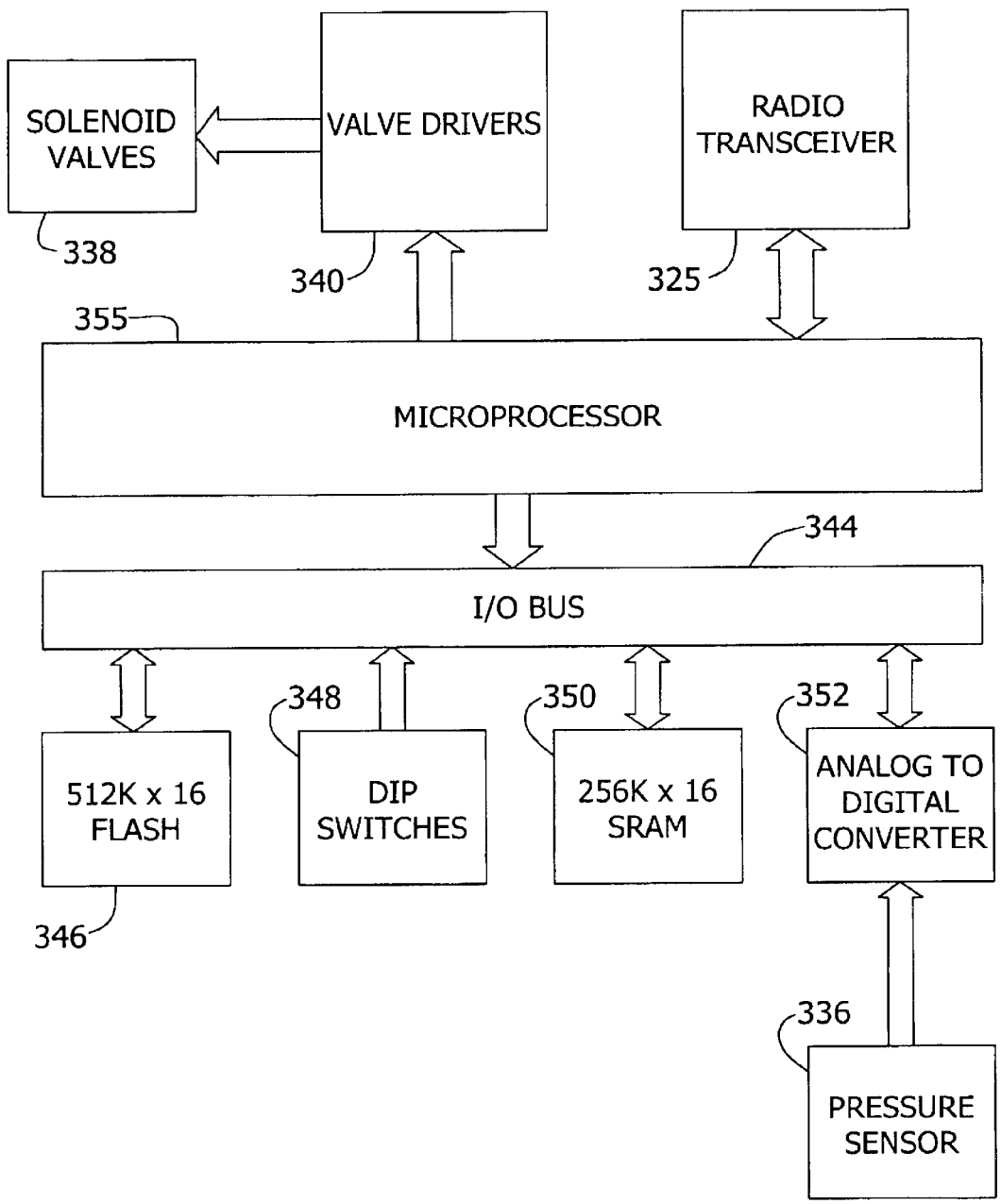
FIG. 8 is a block diagram of a control circuit of the auto-inflation device.

FIG. 8 illustrates a control circuit of the auto-inflation device. The various components of the circuit are mounted on a circuit board 342 (FIG. 5) disposed in the casing, including an 1/0 bus 344, flash memory 346 for storing software, dip switches 348 for providing the auto-inflation device with a particular identity, SRAM 350 for storing data, an analog to digital converter 352 communicating with the pressure sensor for converting the analog air pressure measurement taken by the sensor, and the RF link 125. A microprocessor 355 is also mounted on the circuit board for communicating with the various control circuit components and controlling operation of the valve 333 in accordance with an auto-inflation program loaded into flash memory 346 to selectively operate the valve between its inflate, deflate and closed positions to adjust the air pressure in the tire.

Figure 7:
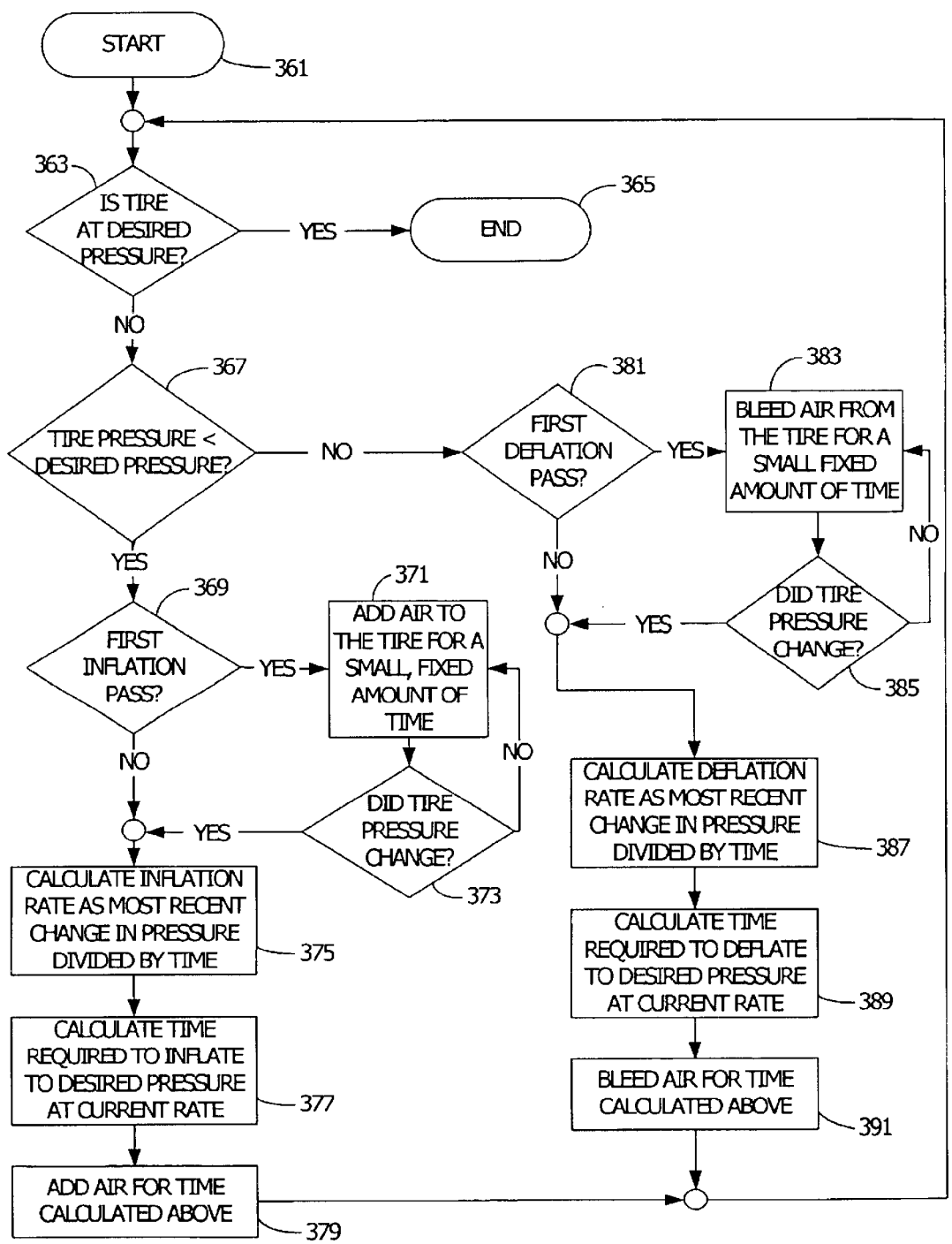
FIG. 7 is a flow chart of an auto-inflation program of the auto-inflation device.

Referring to the flow chart of FIG. 7, the auto-inflation program commences at a start terminal 361 and proceeds to a decision block 363 in which the current tire air pressure is measured and compared against the desired tire air pressure received by the RF link 325 to determine whether the current tire air pressure is generally equal to the desired tire air pressure. If so, further adjustment of the air pressure is unnecessary and the program terminates at an end terminal 365, ending the air pressure adjustment. If not, the program proceeds to a next step 367 at which the program determines whether the current tire air pressure is less than or greater than the desired tire air pressure. If it is less than the desired tire air pressure the program executes an inflation process, and if it is greater than the desired tire air pressure the program executes a deflation process.

The inflation process starts at step 369 by determining whether this is the first pass through the inflation process. If so, the program executes a function 371 in which the microprocessor 355 signals the valve drivers 340 to move the solenoid valves 348 to operate the valve 333 in its inflate position for a predetermined small period of time (e.g., 2 seconds), thereby increasing the volume of air in the interior volume of the tire. At a following step 373, the auto-inflation device 27 again measures the tire air pressure via the pressure transducer and determines whether the tire air pressure has increased slightly upon the addition of air to the tire. If not, the program merely returns to the preceding step 371 until an increase in tire air pressure is measured.

Once a change in tire air pressure is measured, the microprocessor executes a series of functions 375, 377, 379, the first of which calculates a tire inflation rate by dividing the measured change in air pressure, caused by the addition of air to the tire, by the small time period that air was added to the tire (e.g., psi/sec). At the next function 377, the microprocessor 355 calculates the difference between the desired tire air pressure and the current measured air pressure in the tire and, based on the previously calculated inflation rate (e.g., by dividing this difference by the inflation rate), determines the period of time it would take to add enough air to the tire to increase the tire air pressure to the desired air pressure. At the third function 379, the microprocessor 355 signals the valve drivers 340 to move the solenoid valves 348 to operate the valve 333 in its inflate position for the previously calculated period of time to inflate the tire to the desired tire air pressure. The program then returns to step 363 to check whether the adjusted tire air pressure is generally equal to the desired tire air pressure.

The deflation process is substantially similar to the inflation process, starting with a step 381 at which the microprocessor 355 determines whether this is the first pass through the deflation process. If so, the program proceeds to a following step 383 at which the microprocessor 355 signals the valve drivers 340 to move the solenoid valves 348 to operate the valve 333 in its deflate position for a predetermined small period of time, thereby bleeding air from the interior volume of the tire. At a following step 385, the auto-inflation device again measures the tire air pressure via the pressure transducer and determines whether the tire air pressure has decreased slightly upon the bleeding of air to the tire. If not, the program merely returns to the preceding step 383 until a decrease in tire air pressure is measured.

Once a decrease in tire air pressure is measured, the program steps through a series of functions 387, 389, 391. At the first function 387, the microprocessor 355 calculates a tire deflation rate by dividing the measured change in air pressure, caused by the bleeding of air from the tire, by the small time period that air was bled from the tire. At the next function 389, the microprocessor 355 calculates the difference between the desired tire air pressure and the current measured air pressure in the tire and, based on the previously calculated deflation rate (e.g., by dividing this difference by the deflation rate), determines the period of time it would take to bleed enough air to the tire to reduce the tire air pressure to the desired air pressure. At the third function 391, the microprocessor 355 signals the valve drivers 340 to move the solenoid valves 348 to operate the valve 333 in its deflate position for the previously calculated period of time to deflate the tire to the desired tire air pressure. The program then returns to step 363 to check whether the adjusted tire air pressure is generally equal to the desired tire air pressure.

As discussed above, the program continues execution, selectively inflating or deflating the tire when necessary, until the adjusted tire pressure is generally equal to the desired tire air pressure.

Figure 9:
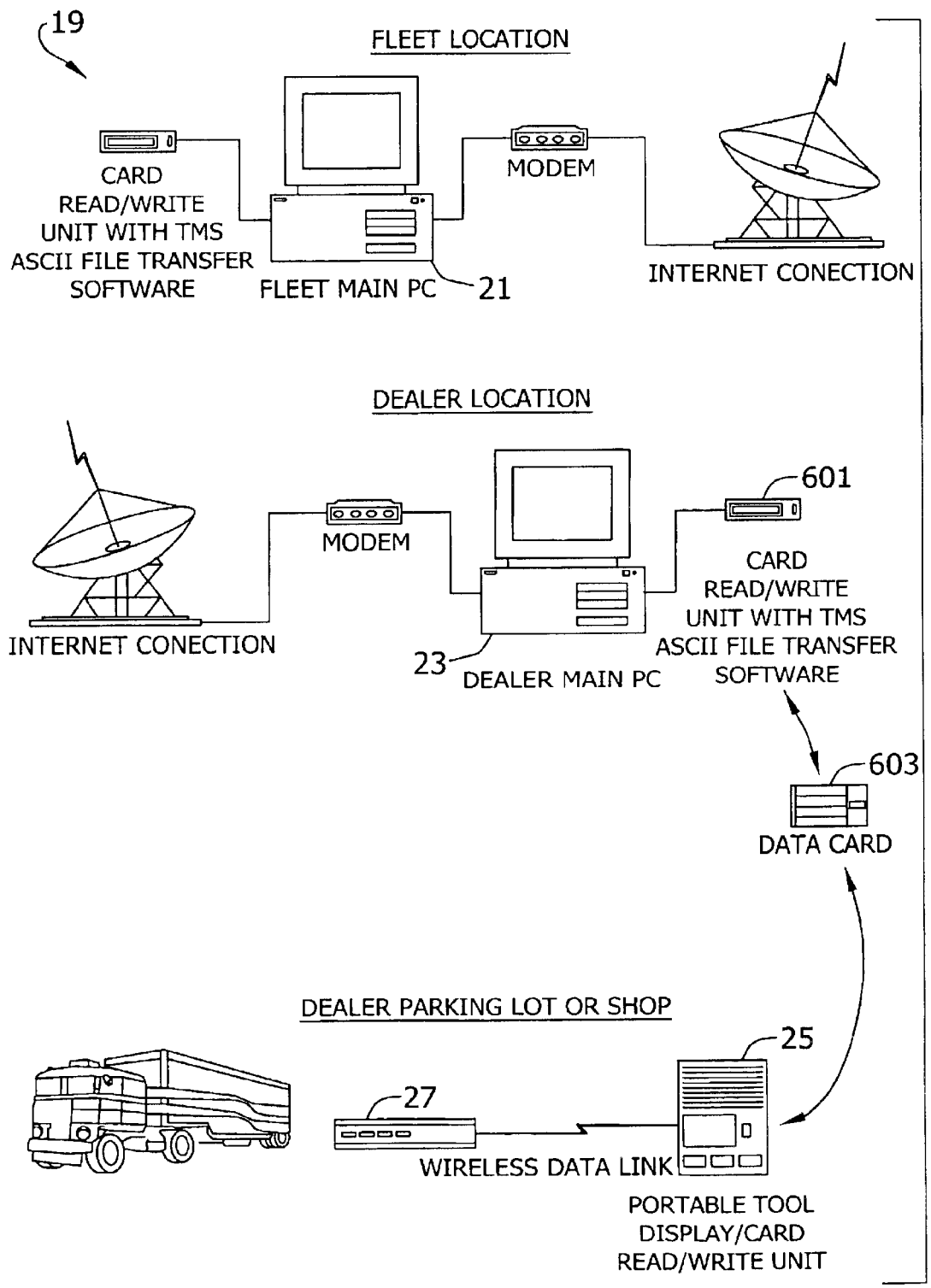
FIG. 9 is a block diagram of a tire management system according to another preferred embodiment of the invention.

Referring now to FIG. 9, in an alternative embodiment of the invention, system 19 includes a data card read/write unit 601 loaded with, for example, tire management software ASCII file transfer software for use in transferring data from database computer 23 to handheld unit 25 via a data card 603. In this alternative embodiment, handheld unit 25 is adapted to read and write on the data card 603.

In another embodiment not shown in the drawings, the handheld unit 25 is adapted for wireless communication with a data chip installed in the tire for gathering tire data measurements, such as tire air pressure and temperature, directly from the chip.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A tire management system for surveying and servicing a vehicle tire, the system comprising:
    a portable handheld computer unit capable of receiving and storing data for servicing the vehicle tire and data acquired from the vehicle tire, said servicing data comprising a desired tire air pressure; and
    a tire inflation device adapted to automatically inflate or deflate the vehicle tire to the desired tire air pressure, the handheld computer unit being adapted for transmitting said servicing data to the tire inflation device from a location remote from the tire inflation device, the tire inflation device being further adapted to receive the desired tire air pressure transmitted by the handheld computer unit and to transmit a signal back to the handheld computer unit once the tire has been serviced by the inflation device to the desired tire air pressure.

2. A tire management system as set forth in claim 1 wherein the signal transmitted by the tire inflation device back to the handheld unit comprises the acquired data, said acquired data including the actual air pressure within the tire.

3. A tire management system as set forth in claim 2 wherein the handheld computer unit has a radio frequency transceiver to permit transmission of said servicing data and reception of said acquired data transmitted by the inflation device, the tire inflation device also having a radio frequency transceiver to permit reception of the servicing data transmitted by the handheld computer unit and transmission of the acquired data back to the handheld unit.

4. A tire management system as set forth in claim 2 further comprising a tread depth probe for measuring the tread depth of the vehicle tire, the tread depth probe being capable of transmitting the measured tread depth to the handheld computer unit for storage therein.

5. A method of surveying and servicing the tire of a vehicle comprising the steps of:

inputting data for servicing the tire into a portable handheld computer unit, said servicing data including a desired tire air pressure for the vehicle tire;

transmitting the desired tire air pressure from the handheld computer unit to a tire inflation device capable of receiving the desired tire air pressure, operating the tire inflation device in response to receipt of the desired tire air pressure to measure the actual tire pressure of the tire and to transmit the actual tire pressure back to the handheld computer unit for storage therein, and further operating the tire inflation device in response to receipt of the desired tire air pressure to inflate or deflate the tire to the desired tire air pressure and to transmit a final measured tire air pressure back to the handheld computer unit.

6. The method of claim 5 further comprising the step of determining the desired tire air pressure based on historical tire data and the particular vehicle on which the tire is located, said step being performed prior to inputting the desired tire air pressure into the handheld computer unit.

7. The method of claim 5 further comprising the step of transmitting the actual measured tire air pressure and final measured tire air pressure from the handheld unit to a remote computer for storage in said remote computer.

8. The method of claim 5 further comprising the step of acquiring data from the vehicle tire other than the measured tire air pressure, said step of acquiring data from the vehicle tire occurring simultaneously with at least one of said transmitting, operating and further operating steps.

9. The method of claim 8 where said step of acquiring data from the vehicle tire comprises measuring the tread depth of the tire with a tread depth probe.

* * * * *